United States Patent
DeLozier et al.

(10) Patent No.: US 10,289,464 B1
(45) Date of Patent: May 14, 2019

(54) ROBUST EVENT PREDICTION

(71) Applicant: Progressive Casualty Insurance Company, Mayfield Village, OH (US)

(72) Inventors: Gregory Steven DeLozier, Mayfield Village, OH (US); Evan Joseph Sanford, Mayfield Village, OH (US); Joseph Mark Blanchard, Mayfield Village, OH (US); Gino Pasquale DiFranco, Mayfield Village, OH (US)

(73) Assignee: PROGRESSIVE CASUALTY INSURANCE COMPANY, Mayfield Village ( * ) Notice: Subject to any disclaimer, the term of this patent is extended or adjusted under 35 U.S.C. 154(b) by 0 days.

(21) Appl. No.: 16/038,980

(22) Filed: Jul. 18, 2018

(51) Int. Cl.
*G06F 11/07* (2006.01)
*G06F 11/30* (2006.01)

(52) U.S. Cl.
CPC ...... *G06F 11/0709* (2013.01); *G06F 11/0778* (2013.01); *G06F 11/3006* (2013.01); *G06F 11/3072* (2013.01)

(58) Field of Classification Search
CPC .......................... G06F 11/0709; G06F 11/008
USPC ....................................................... 714/47.3
See application file for complete search history.

(56) References Cited

U.S. PATENT DOCUMENTS

| | | | |
|---|---|---|---|
| 2005/0251802 A1* | 11/2005 | Bozek | G06F 9/5077 718/1 |
| 2007/0101202 A1* | 5/2007 | Garbow | G06F 11/008 714/47.2 |
| 2012/0144242 A1* | 6/2012 | Vichare | G06F 11/0751 714/39 |
| 2015/0227100 A1* | 8/2015 | Uwatoko | G03G 15/55 399/9 |
| 2015/0323926 A1* | 11/2015 | Wang | G05B 19/0423 700/19 |
| 2016/0300148 A1* | 10/2016 | Kelly | G06N 5/048 |
| 2017/0054610 A1* | 2/2017 | Vangala | G06F 11/079 |
| 2017/0131710 A1* | 5/2017 | Chen | G05B 23/0283 |
| 2017/0278133 A1* | 9/2017 | Corrado | G06Q 30/0255 |

\* cited by examiner

*Primary Examiner* — Chae M Ko
(74) *Attorney, Agent, or Firm* — Brinks Gilson & Lione

(57) ABSTRACT

A system and method predicts events in a computer system. The system and method includes a controller that receives a crash profile. The controller generates granular information that identifies data indicative of a potential server cluster failure in an enterprise system without needing to identify an originating cause of the potential server cluster failure. The system and method trains a model by sampling portions of a profile that may include directives and data indicative of a normal operating state and a conditioned preamble operating state. The system and method provides a trained model to a prediction engine. The system and method modifies an allocation of computing resources in response to the prediction of the potential server cluster failure by the prediction engine monitoring one or more servers of a server cluster.

30 Claims, 16 Drawing Sheets
(10 of 16 Drawing Sheet(s) Filed in Color)

ROBUST EVENT PREDICTION

BACKGROUND OF THE DISCLOSURE

1. Technical Field

This disclosure relates to complex computer systems, and specifically to mitigating complex computer failures through predictions.

2. Related Art

The reliability of clusters is often measured by performance. When operating, a failure of one or more computers in a cluster can go undetected because the remaining servers of the cluster usually remains available. Current failure detection systems look at clusters as a monolith. They do not analyze the clusters' individual servers operating states or their individual consumption of resources. While current failure detection systems improve some systems' performance, unexpected system crashes still occur. Further, some failure detection systems do not predict failures or provide sufficient lead-time to prevent them.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The elements in the figures are not necessarily to scale, emphasis instead being placed upon illustrating the principles of the disclosure. Moreover, in the figures, like referenced numerals designate corresponding parts throughout the different views.

DETAILED DESCRIPTION

Figure 1:
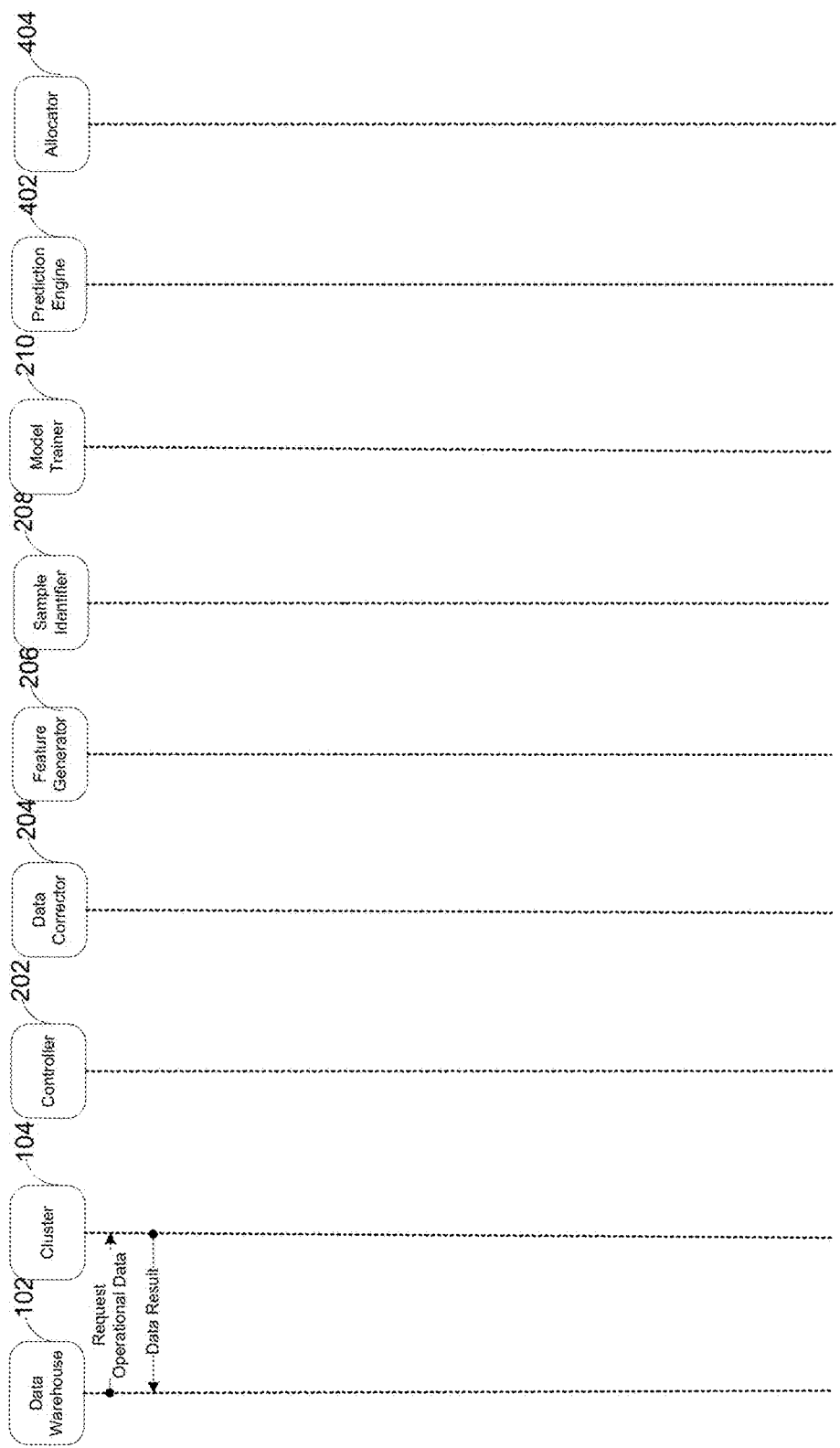
FIG. 1 is a flow diagram of a process mining data.

An automated predictive system improves the reliability of computers, servers and/or clusters (hereinafter referred to as device(s)) by detecting operating conditions that precede device failures. Unlike reactive approaches that detect failures once they occur, the automated predictive system is prognostic. It prevents data loss and performance degradation that usually comes with device failures. The system provides predictions with sufficient lead-times to mitigate or prevent failures efficiently. Some systems execute proactive functions before a failure occurs, such as modifying resource allocations, load balancing, initiating instant maintenance server resets and/or modifying maintenance schedules, for example. Other systems bring additional devices or surrogates on-line in response to a prediction so that the other devices or surrogates can provide continuous service preceding or during failures. Identifying the likelihood of a failure of a device with sufficient lead-time improves computer technology because it keeps computer services on-line, limits the unexpected time and unexpected expense incurred in a recovery, and limits the costs that come with frustrated customers and lost revenue.

Some automated predictive systems provide near real-time analysis (analyzing data as fast or nearly as fast as the rate it is received) and are capable of providing continuous or periodic feedback. The feedback identifies the likelihood of one or more potential failures, where the potential failures are likely to occur, and/or in some systems, when the potential failures will occur and/or the time-to-failure. The systems provide more timely predictions and fewer false positive predictions than known predictive systems by generating engineered features from normalized data that facilitate the automated predictive system's learning processes. The engineered features characterize patterns detected in entity data that are not apparent from the analysis of original entity data feeds or the data sets alone. Some automated predictive systems apply a time-series analysis and/or a frequency domain analysis.

Because the models generated by the automated predictive systems train on data generated during the times that occur well before a device failure (e.g., normal operating periods) and those that precede failures (e.g., within conditioned preamble periods), the automated predictive systems protect against known and unknown causes of device failures. The systems do not need to detect, identify, or know the originating causes of a device's failure to predict its failure and prevent it. The automated predictive systems are different from data-matching systems that recognize known device failures or causes, typically by comparing data generated during those failures (i.e., during the time the failures are occurring) against a database of similar data. The disclosed operating state-based approach can analyze one or more data feeds and/or data sets to determine if one or more devices will soon be in an undesired or an unstable state that precede a failure.

The automated predictive systems can communicate potential crash profiles (also referred to as crash profiles and/or event profiles) that can be used to train one or more models that attach to the predication engines to monitor devices. The potential crash profiles convey granular information generated by the state-based analysis about normal operating procedures and operating conditions that precede events, such as potential device failures while accounting for interfering events. The potential crash profiles enable a more flexible and nuanced approach to monitoring enterprise systems as it allows predictive systems to intelligently distribute the potential crash profiles to one or more local and/or remote model trainers that serve various remote and/or local computing systems. Further, device administrators can easily tailor predictions and mitigations by applying different operating policies and/or providing different datasets to be used to configure different model trainers that train one or more models that monitor similar or different devices. Having different potential crash profiles that include directives, normal operating state information, and conditioned preamble operating state information that precede an event like potential device failures and occur around interfering events enables administrators to construct operating policies with a high granularity. It also enables administrators to alter those operating policies by changing directives (e.g., instructions) in response to evolving events or failures, interfering events, and pre-event or pre-failure states. The potential crash profile approach can be used to locate when and where a potential event or failure may occur, which allow the automated predictive systems or monitored device to act. The automated predictive systems or monitored device may determine whether to drain traffic from the monitored device, when it should stop taking new sessions, and when to let existing sessions expire. The automated predictive systems or monitored device may shut down unstable code or portions of hardware, a hosting software application, or the monitored device completely by applying a customized operating policy through the potential crash profiles. The operating policy may be enforced based on the monitored device's behavior, or based on one or more particular users' (e.g., a device and/or person) behavior.

Because some automated predictive systems are distributed, meaning they execute operating state-based analysis on and/or among separate and/or remote devices, some automated predictive systems do not rely on the monitored device to execute failure predication, and therefore are resistant to the undesired effects that may be caused by the conditions that precede device failures. Further, by keeping some automated predictive systems remote and/or separate from the monitored devices, some systems do not consume many resources (e.g., processing or memory resources) on the monitored devices. A separate and/or remote automated predictive system does not require additional software installations on the monitored devices and avoids known and unknown vulnerabilities inherent to those devices. These separate and/or remote automated predictive systems may avoid the consumption of significant amounts of memory, avoid the processing of resources, avoid the allocation of high processing privileges, and avoid some regular software updates that would otherwise be required on the monitored devices.

FIG. 1 shows a process for mining data from monitored devices 104 shown as clusters for exemplary purposes. Through data requests, a data warehouse 102 acquires entity data. Entity data may be stored in tables and can be associated with such elements as devices, clients, users, products, accounts, etc. The requests may ask for data generated during specific time-periods and data types. In some systems, the data warehouse 102 is distributed over several servers, contains several database instances (e.g., such as a an event archive 502, a historical database 504, etc.), storing information from multiple sources types, and storing data in a variety of different formats and made up of several instances. In FIG. 1, the data warehouse 102 is a unitary depository accessible to a requesting client device such as the controller 202. Access to the data warehouse 102 is transparent to the requesting client devices, which issue commands to retrieve and analyze some or nearly all of the data it stores. The data warehouse 102 also contains data about how the data warehouse is organized, where the data and/or classes of data can be found, and any connections between the data. The data warehouse 102 also allows the automated predictive systems to organize the data it processes, coordinate updates, and generate functional and structural relationships between data sampled from different monitored devices 104. Because some automated predictive systems receive all of their data from the data warehouse 102, these automated predictive systems never communicate directly with the monitored devices 104 and are isolated from the detrimental effects of the devices' failures and those that propagate from other systems.

Figure 2:
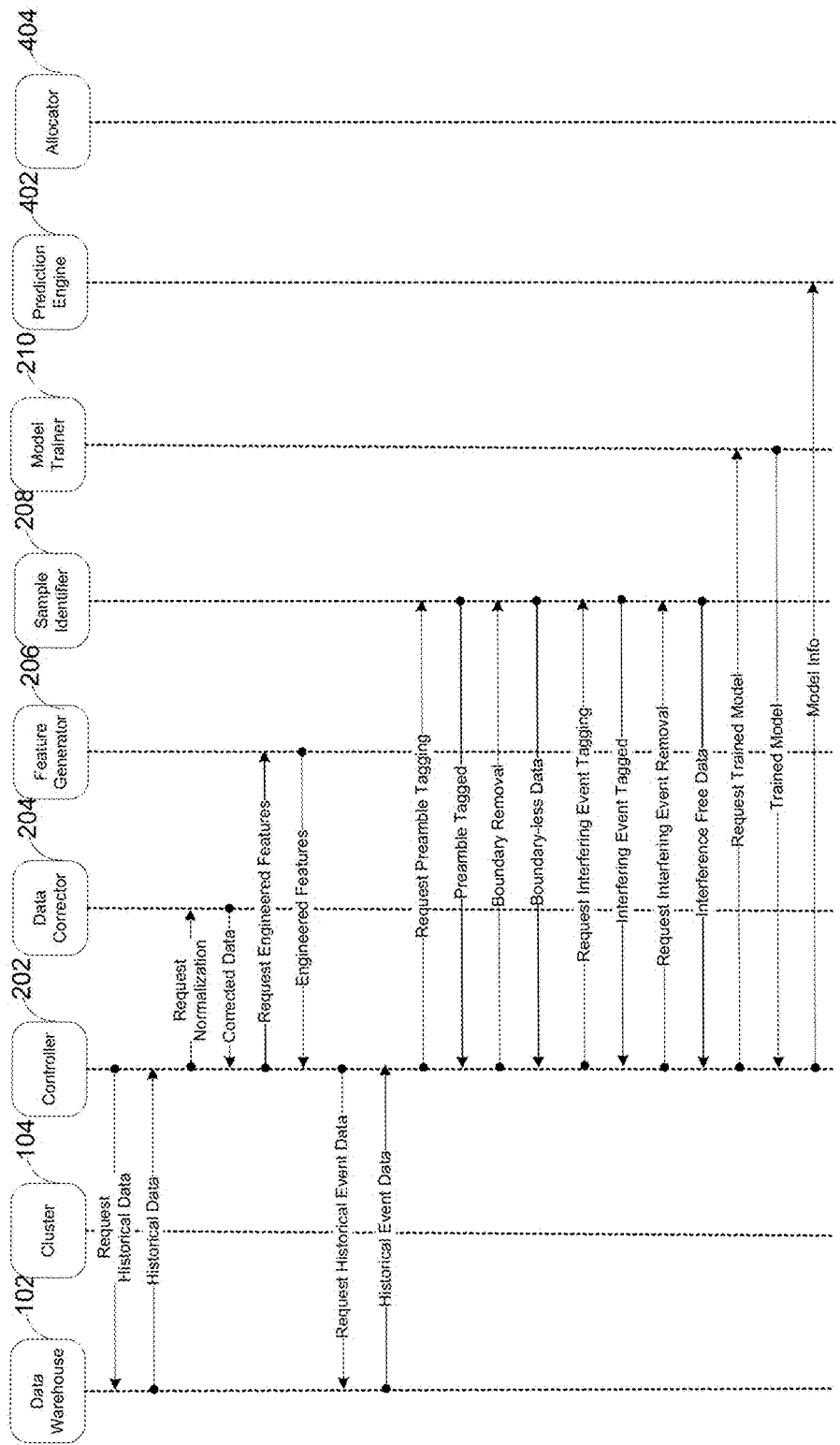
FIG. 2 a second flow diagram of a process that trains predictive systems.

In FIG. 2, a controller 202 is the regulating mechanism. It is an intermediary device situated between the data warehouse 102 and a group of subsidiary devices. The subsidiary devices include a data corrector 204, a features generator 206, a sample identifier 208, a model trainer 210, a predication engine 402 and a resource allocator or allocation module 404. The controller 202 automates the predictive system and perform tasks related to training, predicting, and issuing directives and contexts to the subsidiary devices. In FIG. 2, the controller 202 requests normalization of data (e.g., usually relatively recent data, such as data generated in the preceding two to three months of a device operating session) it receives from the data warehouse 102, and in some applications performs data aggregation.

The data corrector 204 transforms the data into datasets through a normalization. The normalization converts unstructured data from multiple time-periods into a dataset by applying a common scale and combining data. The normalization maintains the general distribution and ratios of the source entity data, while keeping the data within a scale used by the feature generator 206. Some data correctors 204 apply transformation functions (e.g., regression analysis, correlations functions, linear classification functions, etc.) to account for and replace missing values, out of range values, and/or perform data validations (e.g., via comparisons to acceptable data ranges) to reduce distortions.

In some automated predictive systems, data generated by a sub-set or all of the servers of a cluster 104 are combined by the data corrector 204. The aggregation of entity data minimizes outliers, increases the automated predictive systems' capacity and efficiency by reducing volume, and allows the automated predictive systems to monitor specific software and/or hardware applications more completely, including those that may be susceptible to failures.

In FIG. 2, a feature generator 206 increases the predictive strength of the model trainer 210 by creating one or more features from the normalized datasets that are predictive of a preamble period or periods. A preamble period (also referred to as a preamble) is a bounded time period preceding a failure that may be measured in seconds, minutes, or hours. In the normalized data, preamble periods are identified by detecting the time of a failure and analyzing the data preceding that failure's occurrence. By its identification and sampling of preceding data, the automated predictive systems can provide the model trainer with a set of conditions that are indicative of a potential failure that lies outside of normal operating conditions without knowing the causes of the subsequent failure.

The selection of engineered features differentiates patterns in normalized data and provides additional information related to preamble detection that is not captured in the original entity dataset. An engineered feature is computed by combining various current and historical measurements to generate new values. Sometimes an engineered feature is generated from values representative of the current state of the device and sometimes only those values. Other engineered features generate features that also include historical data. Derivatives, rolling averages, exponential moving averages (e.g., weighting for each older datum decreases exponentially) among others may be used to include historical influences in some engineered features.

One or more types of rolling average engineered features of a device characteristic, such as device memory indicators (e.g., memory use or changes in memory use), can be executed to remove seasonality (e.g., characteristic in which the data experiences reoccurring regular and predictable changes) and noise from the normalized dataset. To generate detectable differences between preamble periods and normal operating periods, some automated predictive systems calculate rolling averages over time periods of variable lengths. For example, some automated predictive systems calculate rolling averages over the last sixty minutes, last thirty minutes, last fifteen minutes, etc., of one or more operating sessions. By weighting these calculated periods (for instance, through a gradient boost algorithm) and comparisons to reference distributions associated with preamble periods (e.g., via an Kolmogorov-Smirnov function for distribution comparison) preamble periods can be more accurately and precisely detected.

Other measures, such as symmetry, or more precisely a lack of symmetry, can be used with the rolling average engineered feature for preamble detection. For example, a skewness measure can be generated to better differentiate patterns. A dataset is symmetric if it looks the same to the right and to left of a center point. A kurtosis measure can also be used to determine whether the rolling average is heavy tailed or relative to the distribution associated with known preamble periods. That is, datasets with high feature-kurtosis tend to have heavy tails, or outliers. Datasets with low feature-kurtosis tend to have light tails, or lack of outliers.

In alternate automated predictive systems, one or more other device characteristics are processed to create other engineered features. These characteristics may process memory pressure (e.g., a measurement of the decline in the amount of free virtual memory), memory discharge space, the number of active software applications running, sizes of available microprocessor caches, etc., for example, using engineered features. When operating in a Windows environment, for example, the controller 202 may request over a thousand instances of entity data from the Windows' server logs, for example, and the feature generator 206 may generate over sixty different engineered features after the data is normalized data. In these systems, the feature generator 206 may create any one or more features that facilitate the learning process.

In FIG. 2, the controller 202 selects contributory-engineered features and eliminates non-contributory and duplicate contributory-engineered features in some instances through a principal component analysis. In some instances, it is not always necessary to perform a selection and elimination (referred to as conditioning). The selection and elimination may depend on the normalized data, the model trainer 210, and the objectives of the detections. When a selection and elimination is used, a principal component analysis may be executed. A principal component analysis uses an orthogonal transformation to compare certain engineered features that are predictive of that state to other engineered features that are predictive of that state to eliminate non-contributory engineered features and duplicate contributory-engineered features.

The generation and selection of certain contributory-engineered features increase the efficiency in identifying preamble periods by extracting the information contained in the datasets by processing fewer resources. The use of fewer engineered features also improve the efficiency of the controller 202 and sample identifier 210 to tag event data accurately and to robustly predict the timing of preamble periods (e.g., the time the preamble period occurs and its duration). Engineering features and feature selection when used, makes preamble period detection computationally tractable. It does so by enhancing the normalized data via engineered features and reducing the number of features needed to tag the preamble periods. Whether conditioning is needed or not, the historical event data requested from the data warehouse 102 by the controller 202 describes entities (e.g., a publish and subscribe application within an operating system, for example), the actions performed by the entities, (for example, "publish entity data") and behavior data. The behavior data may include one, two, and/or three pieces of information: an action, a timestamp, and a state. The action is the process that is occurring (e.g., "to publish," for example). The timestamp is a digital record of the time of the occurrence of that action. The state refers to all other relevant information that the automated predictive systems desired to include about an event, including information about the entities related to the event, the source of the event data, the data management system associated with the application generating the data, the device identifiers, device types, the data types, users, etc.

In FIG. 2, the sample identifier 208 tags the preamble periods of the historical event data that includes a preamble event. The tags identify the time that a failure begins designated T (the beginning of an actual failure event, for example) and a predetermined time that precedes it, designated T-S, where S is the interval size of the preamble.

Figure 3:
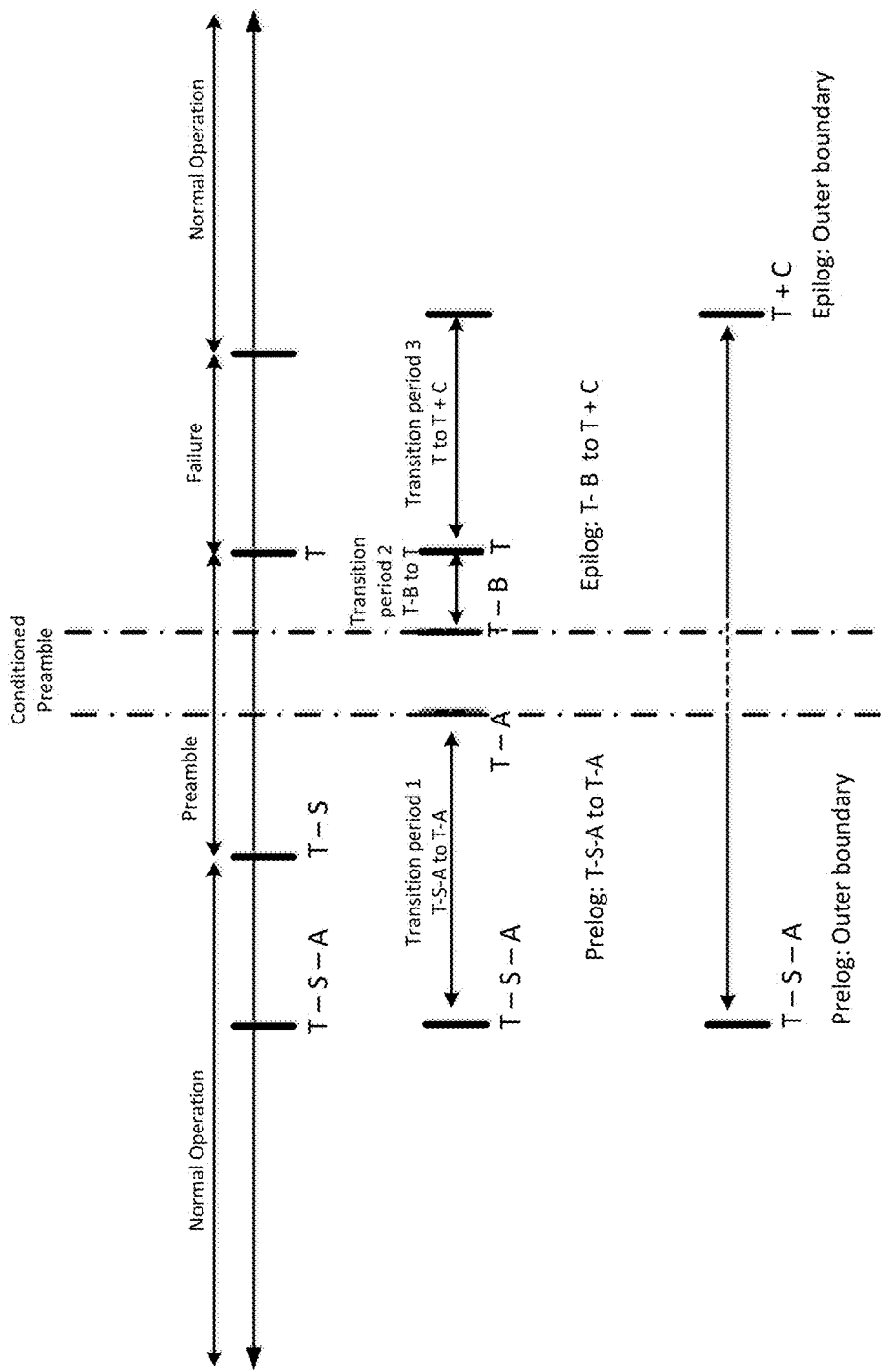
FIG. 3 is a block diagram showing characteristics of a boundary removal.

With the preamble period running from T-S to T, the sample identifier 208 removes a first boundary T-S of the interval. In FIG. 3, the sample identifier 208 trims the preamble period by removing a first transition period of length A. This serves to separate the conditioned preamble period from measurements that occur during normal operation and removes transitionary events that are measured at the boundary T-S from training. It effectively removes normal and preamble events from interacting with one another by removing a prelog. To remove indicators that are strongly predictive but to close to a failure to have actionable predictive value, the sample identifier 208 removes a second and third transition period of length B and C, respectively, before and after the failure boundary T By removing the transition period or epilog, the sample identifier 208 removes indicators occurring immediately adjacent to the failure, indicators occurring during the failure that might be captured due to logging errors or due to recovery activities, and indicators that occur during later transitory events. In FIG. 3, the conditioned preamble period ranges from T-A to T-B, where the first and/or second transition periods may be fixed or adjustable subject to a desired optimization and the third transition period may be fixed or adjustable subject to a desired optimization and the length of a failure period. Samples of the event data within TS A to T+C are stored in an event archive 502 with samples of the event data within the conditioned preamble period T-A to T-B.

To account for other conditions that may cause a device to operate abnormally, the controller 202 requests that the sample identifier 208 remove interfering events. Interfering events include indicators that reflect a manual reset of a device, the identification of an in process recovery, the identification of successive device failures (where the preamble of a third failure, for example, may include portions of one or more prior failures), security updates, etc.

In FIG. 2, sample identifier 208 tags interfering events in the historical event data through comparisons to empirical data indicative of such events. The tags identify the time that the interfering event occurred, designated V (the time of the actual interfering event), and a predetermined time that precedes the interfering event and follows the interfering event designated V-X, and V+Y. X is a fourth transition period and Y is a fifth transition period. The fourth and/or fifth transition periods may be fixed or adjustable subject to a desired optimization. The use of transitionary periods X and Y removes transitionary events that occur at the interfering event boundaries and indicators that are strongly predictive but too close to an interfering event to have actionable predictive value.

With the interfering event period identified as running from V−X to V+Y and stored in an event archive 502 (in FIG. 5), the sample identifier 208 removes the interval from an instance of the historical event data. In all, the sample identifier 208 effectively isolates normal operations, preamble events, and interfering events. They do not interact with one another. As shown in FIG. 2, the tagging and removal of preamble boundaries and interfering events occurs through multiple request-response exchanges. In alternate automated predictive systems, the tagging and removal occurs through a single request-response, and in others, it occurs through two separate requests. One requesting the tagging and removal of boundaries and the second requesting the tagging and removal of interfering events. In other alternate automated predictive systems, the tagging and removal of boundaries or interfering events in one or more sessions is optional.

With the outer boundaries of the prelog (T−S−A) and epilog (T+C) established as shown in FIG. 3 along with the conditioned interfering event periods from V−X to V+Y, the controller 202 may identify when normal conditions occur. Normal conditions are identified by removing the intervals between the prelog and epilog outer boundaries and the conditioned interfering events in an instance of the historical event data. Labeled samples of normal conditions and the conditioned preamble are then stored as the granular information in the potential crash profile linked to directives in the event archive 502. Some samples are used for training others are used for model evaluation.

To account for the scarcity of true normal operating events, some automated predictive systems' controllers 202 oversample the preambles or, alternatively, under-sample the normal periods of an operating session. In some instances, the controller 102 may reduce the sampling of normal data by either including only samples from devices that also have preamble data, and by including only enough normal data to create an effective sampling population of the normal periods in the potential crash profile.

Figure 7:
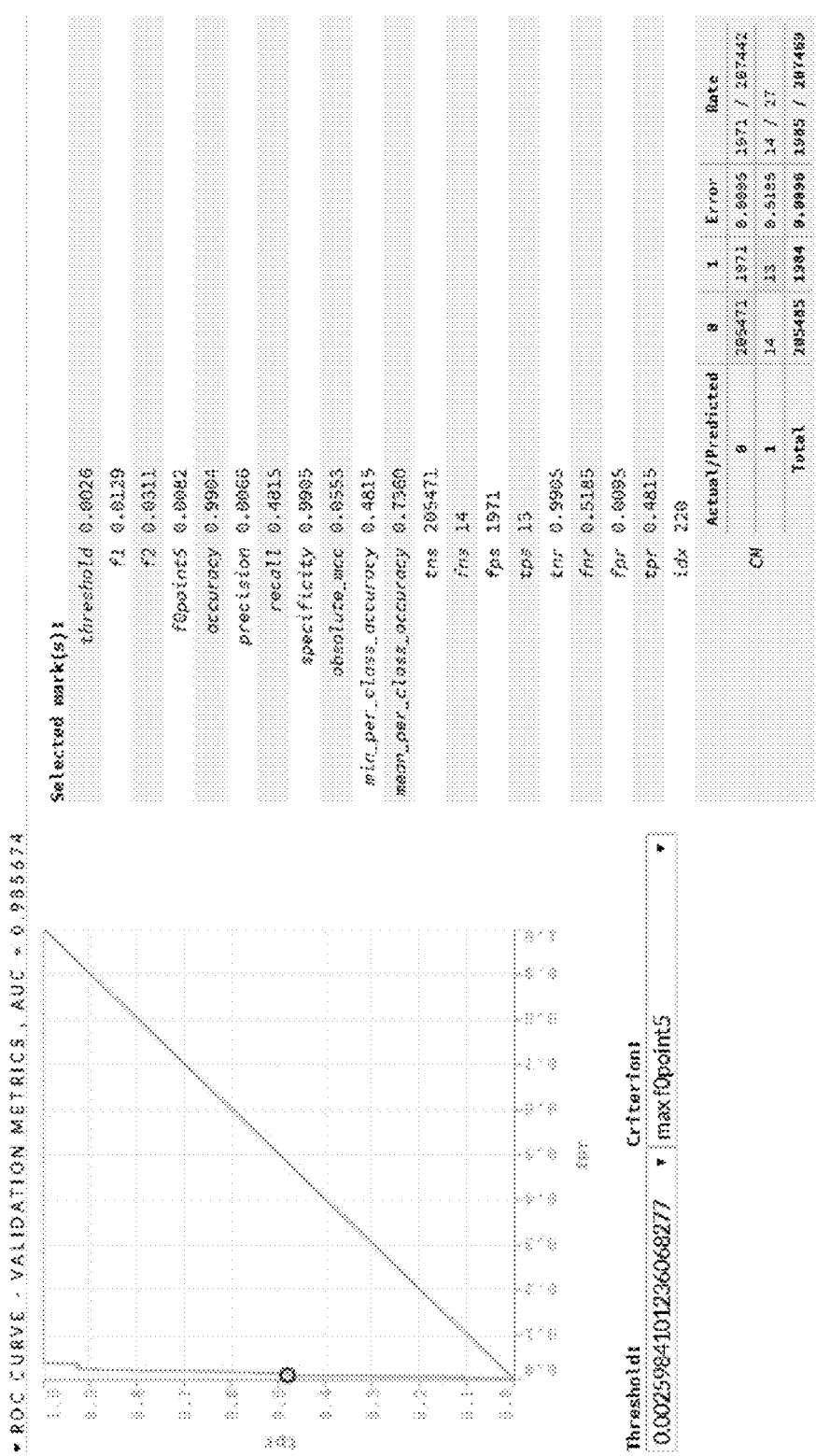
FIG. 7 shows the results of an evaluation of a predictive model.

Using machine learning techniques and the potential crash profiles, the automated predictive systems train and test models. The training process begins by the model trainer 210 selecting a classification or regression model based on a desired outcome. Here, the model trainer 210 may train a classifier model that may be decision trees, decision forests, gradient boosting, rules, etc., using a portion of the labeled samples provided in the potential crash profile provided by controller 202. Once trained, the model trainer 210 evaluates the models by processing some of the other labeled samples provided by the potential crash profiles to select one or more suitable classifiers based on the accuracy and usefulness of the models to identify one or more undesired conditions. Validation may be measured via a ROC curve that may measure the validity of a model as shown in one exemplary validation depicted in FIG. 7. As shown, there were 1971 occasions out of 207,442 occasions that incorrectly predicted a failure condition in this example. Further, there were 13 occasions out of 27 occasions that the model correctly predicted the preamble. This rendered an aggregate error rate of less than one percent. If acceptable, a model is selected and provided or attached to the prediction engine 402, which predicts events.

Figure 4:
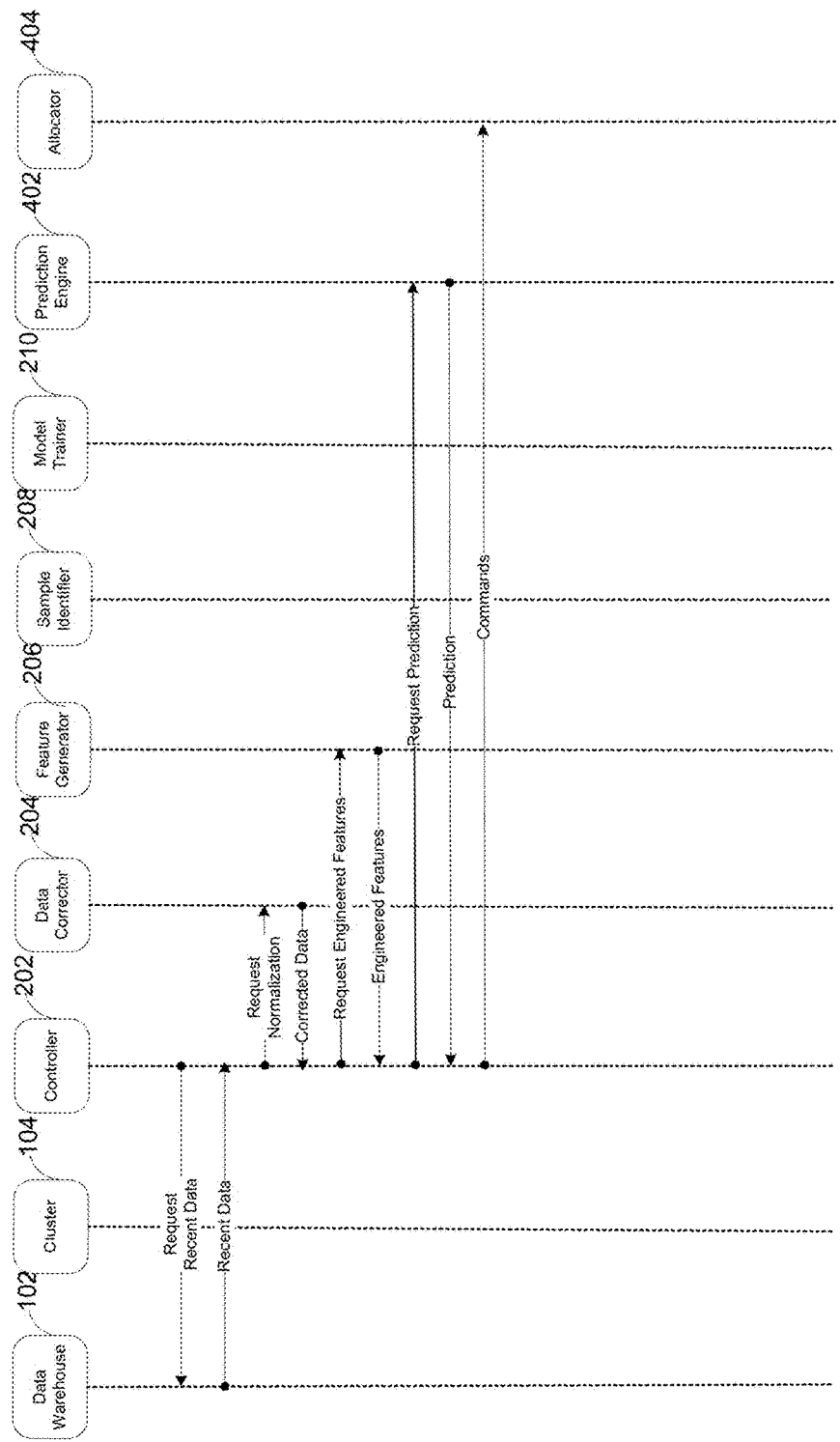
FIG. 4 a third flow diagram of a process that performs failure predictions.

Using the schema of compatible engineered features, the selected model predicts events such as potential device failures by the process shown in FIG. 4. The process begins with a data request for entity data. The requests may ask for data generated during specific time periods and data types. In some systems, the data warehouse 102 is distributed over several computers, contains several databases and information from multiple sources types, and stores the data in a variety of different formats.

The controller 202 then requests normalization of the data (e.g., usually relatively recent data) from the data warehouse 102 and in some applications, requests a data aggregation. The data corrector 204 transforms the data into datasets through a normalization. The normalization converts unstructured data from multiple time-periods into a dataset by applying a common scale and combining data. The normalization maintains the general distribution and ratios from the source entity data in the dataset, while keeping the data within a scale used by the feature generator 206. Some data correctors 204 apply transformation functions (e.g., regression analysis, correlations functions, linear classification functions that normalize by feature, etc.) to generate surrogates for missing values and perform data validations (e.g., via comparisons to acceptable data ranges) to reduce distortions.

In FIG. 4, the feature generator 206 increases the predictive strength of the model trainer 210 by creating one or more engineered features from the normalized datasets that are predictive of a preamble period or periods. The engineered features are computed by combining various current and historical measurements to create new values, and in some instances, a sub-set selected by the processes described above.

With the engineered features and entity data in a format compatible with the trained model, the prediction engine 402 returns a prediction to the controller 202. In response to the prediction, the controller 202 may issue commands to a resource allocator 404, the monitored device or another device such as a load balancer, for example, that may modify the allocation of computing resources in a network-computing environment, such as those described above. In addition, the resource allocator 404 and the monitored device or the other device in response to the resource allocator 404 may re-balance computing loads, keep services on-line by substituting surrogate devices for devices that are predicted to fail, shut down unstable code or portions of the hardware, shut down the hosting software application or the monitored device, etc.

Figure 5:
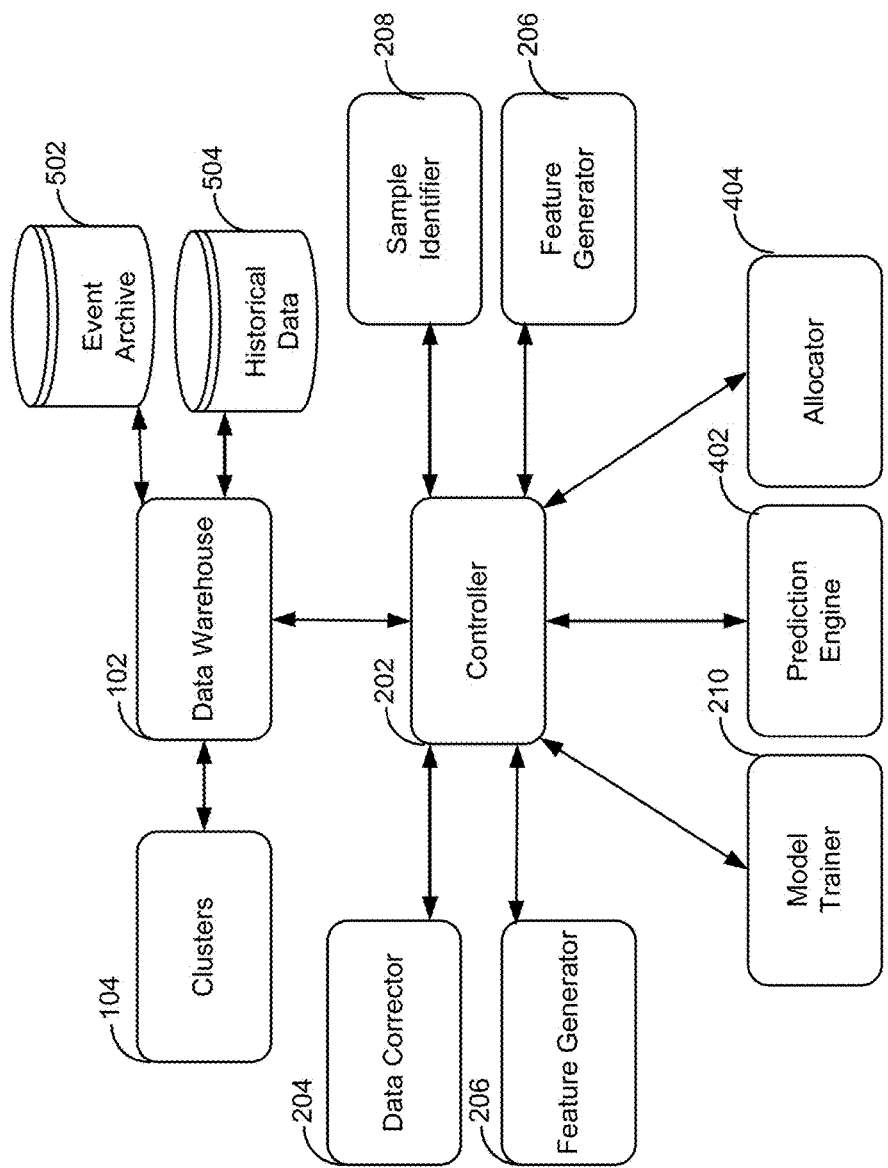
FIG. 5 is a block diagram of a predictive system.

FIG. 5 is a block diagram of the automated predictive system that may execute the process flows described above and those shown in FIGS. 1-4. In FIG. 5 the controller 202 interfaces monitored devices 104 shown as a server clusters through a data warehouse 102. The data warehouse 102 may be distributed over several computers or maybe a unitary depository or a cloud storage. The data warehouse 102 may include several databases (two databases 502 and 504 are shown in FIG. 5) and information from multiple sources types, stores the data in a variety of different formats. The controller 202 interfaces the data corrector 204 (also known as a normalizer) that transforms entity data into datasets through the normalization. The normalization converts unstructured data from multiple time-periods into a dataset by applying a common scale and combining data. The normalization maintains the general distribution and ratios of the source entity data, while keeping the data within a scale used by the feature generator 206. Some data correctors 204 apply transformation functions (e.g., regression analysis, correlations functions, linear classification functions that normalize by feature, etc.) to generate surrogates for missing values and outliers and perform data validations (e.g., via comparisons to acceptable data ranges) to reduce distortions. In some automated predictive systems, the data corrector 204 combines some or all of the monitored data of all of the servers that make up a server cluster.

In FIG. 5, a feature generator 206 creates one or more engineered features from the normalized datasets that are predictive of the preamble period or periods. The engineered features are computed by combining various current and historical measurements to create new values. Sometimes an engineered feature is generated from values representative of the current state of the device and sometimes only those values. Some other engineered features generate features that reflect historical data. In FIG. 5, the controller 202 selects contributory-engineered features and eliminates non-contributory and duplicate contributory-engineered features. In some instances, a selection and elimination is not executed. Whether conditioning is needed or not, the historical event data stored in the event archive 502 maybe accessed by the controller 202 through the data warehouse 102. In FIG. 5, the sample identifier 208 tags the preamble periods within an instant of the historical event data. The tags identify the time that a failure begins and a predetermined time that precedes it. The sample identifier 208 also trims the preamble period by removing a prelog and an epilog. The removal effectively separates normal and preamble events from interacting with one another and further removes indicators occurring immediately adjacent to the failure and those occurring during the failure that might occur due to logging errors. Samples of the event data within the conditioned preamble period are stored in an event archive 502.

To minimize other conditions that may cause a device to operate abnormally, the sample identifier 208 also removes conditioned interfering event periods. Interfering events include indicators that reflect a manual reset of a device, the identification of an in-process recovery, the identification of successive device failures, security updates, etc., for example. The removal of interfering events removes transitionary events that occur at the interfering event boundaries and indicators that are strongly predictive but too close to an interfering event to have actionable predictive value.

The controller 202 identifies normal conditions by removing the intervals between the prelog and epilog outer boundaries and the conditioned interfering events in an instance of the historical event data. Labeled samples of normal conditions are stored as the granular information in the potential crash profile linked to directives in the event archive 502. Some directives identify some samples to be used for training and others to be used for model evaluation.

The automated predictive systems train and test models through a model trainer 210. The model trainer 210 selects a classification or regression model based on the desired outcome. Once trained, the model trainer 210 evaluates the models by processing some labeled samples provided by the potential crash profiles to select the suitable classifier based on the accuracy and usefulness of the model to identify one or more desired conditions. After a model is validated and selected, it is provided or attached to the prediction engine 402 that returns a prediction to the controller 202. In response to the prediction, the controller 202 may issue commands to a resource allocator 404 that may modify the allocation of computing resources in a network-computing environment. The resource allocator 404 or the monitored device or other device in response to the resource allocator 404, may re-balance computing loads, keep services on-line by substituting surrogate devices for devices that are predicted to fail, shut down unstable code or portions of the hardware, shut down the hosting software application, or the monitored device.

Figure 6:
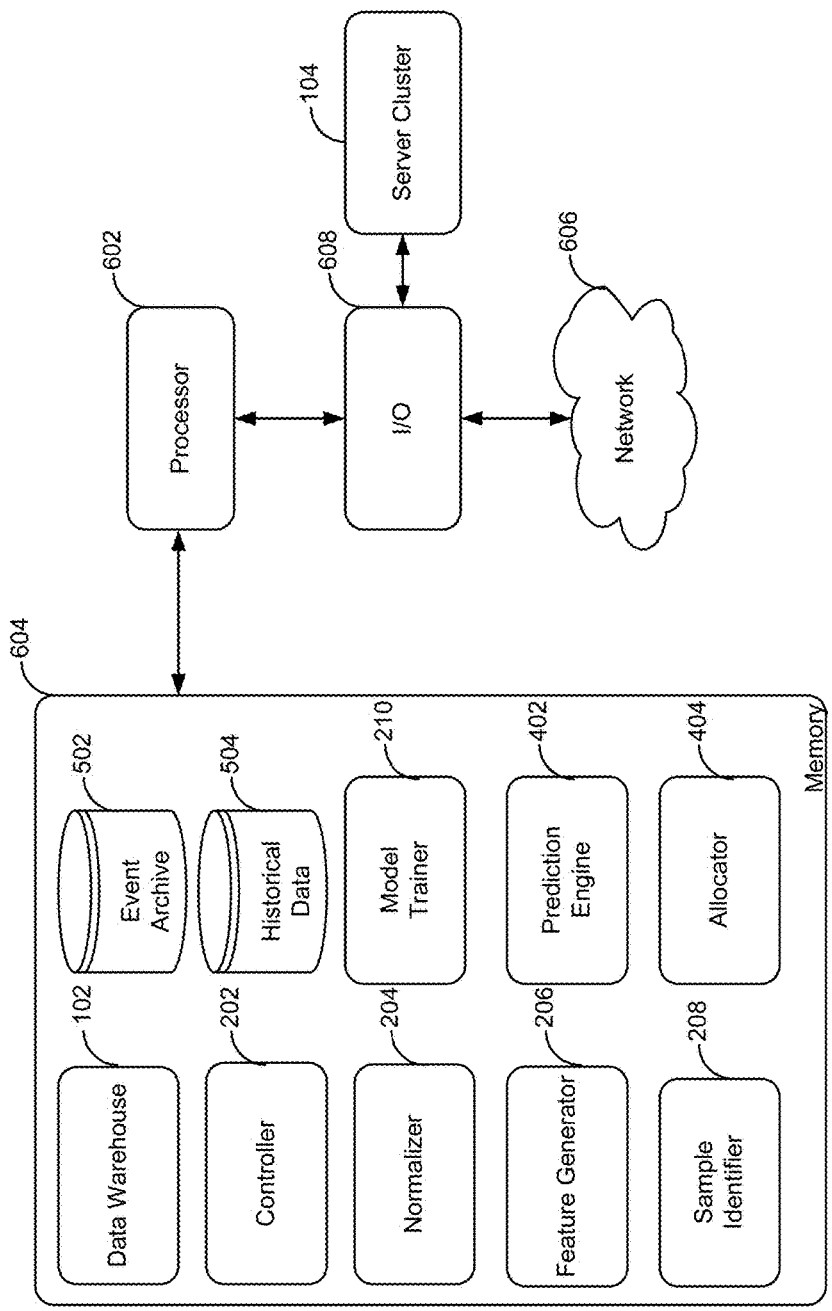
FIG. 6 is an alternate block diagram of a predictive system.

FIG. 6 is a block diagram of an alternate automated predictive system that may execute the process flows and characteristics described above and those shown in FIGS. 1-5. The system comprises a processor 602, a non-transitory media such as a memory 604 (the contents of which are accessible by the processor 602), an optional network 606, a monitored device 104 and an I/O interface 608. The I/O interface 608 connects devices and local and/or remote applications such as, for example, additional local and/or remote monitored devices. The memory 604 stores instructions, which when executed by the processor 602, causes the automated predictive system to render some or all of the functionality associated with predicting a computer-based event such as a device failure, for example. The memory 604 stores instructions, which when executed by the processor 602, causes the automated predictive system to render functionality associated with the data warehouse 102, the controller 202, the normalizer 204, the feature generator 206, the sample identifier 208, the model trainer 210, the prediction engine 402, the resource allocator 404, the event archive 502, and the historical data database 504. In yet another alternate automated predictive system, the non-transitory media provided functionality is provided through cloud storage. In this automated predictive system, cloud storage provides ubiquitous access to the automated predictive system's resources and higher-level services that can be rapidly provisioned over network 606. Cloud storage allows for the sharing of resources to achieve coherence services across many monitored devices at many locations and provides economies of scale.

The memory 604 and/or storage disclosed may retain an ordered listing of executable instructions for implementing the functions described above in a non-transitory computer code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 604 may comprise a single device or multiple devices that may be disposed on one or more dedicated memory devices or disposed on a processor or other similar device. An "engine" may comprise a processor or a portion of a program that executes or supports event predictions such as failure predictions or processes. When functions, steps, etc. are said to be "responsive to" or occur "in response to" another function or step, etc., the functions or steps necessarily occur as a result of another function or step, etc. It is not sufficient that a function or act merely follow or occur subsequent to another. Further, the term "failure" generally refers to a computer system or related device that does not operate reliably or operate at all. A "failure" may be caused by software or hardware.

Figure 8:
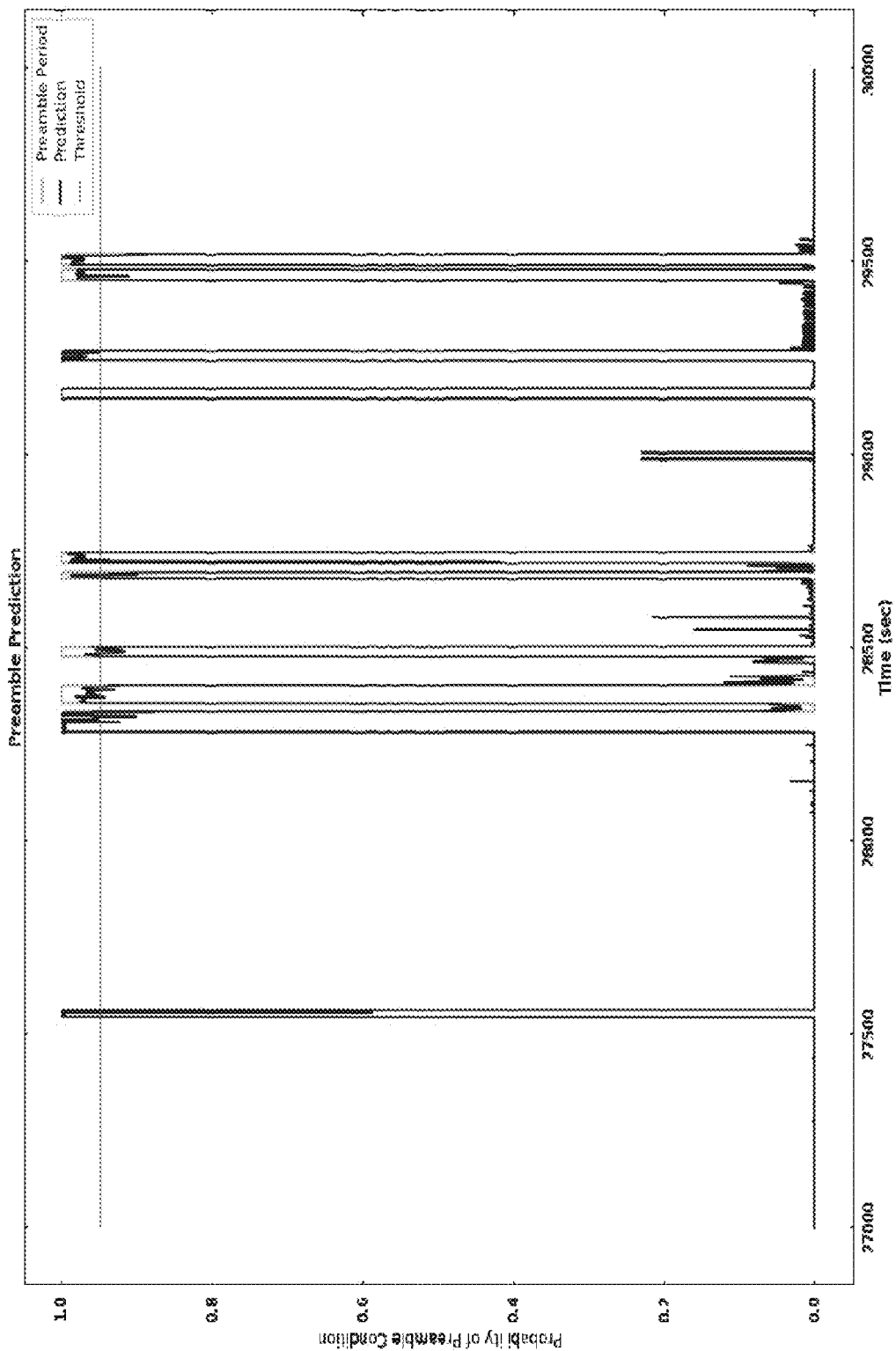
FIG. 8 is a disruption analysis of a server.
Figure 9:
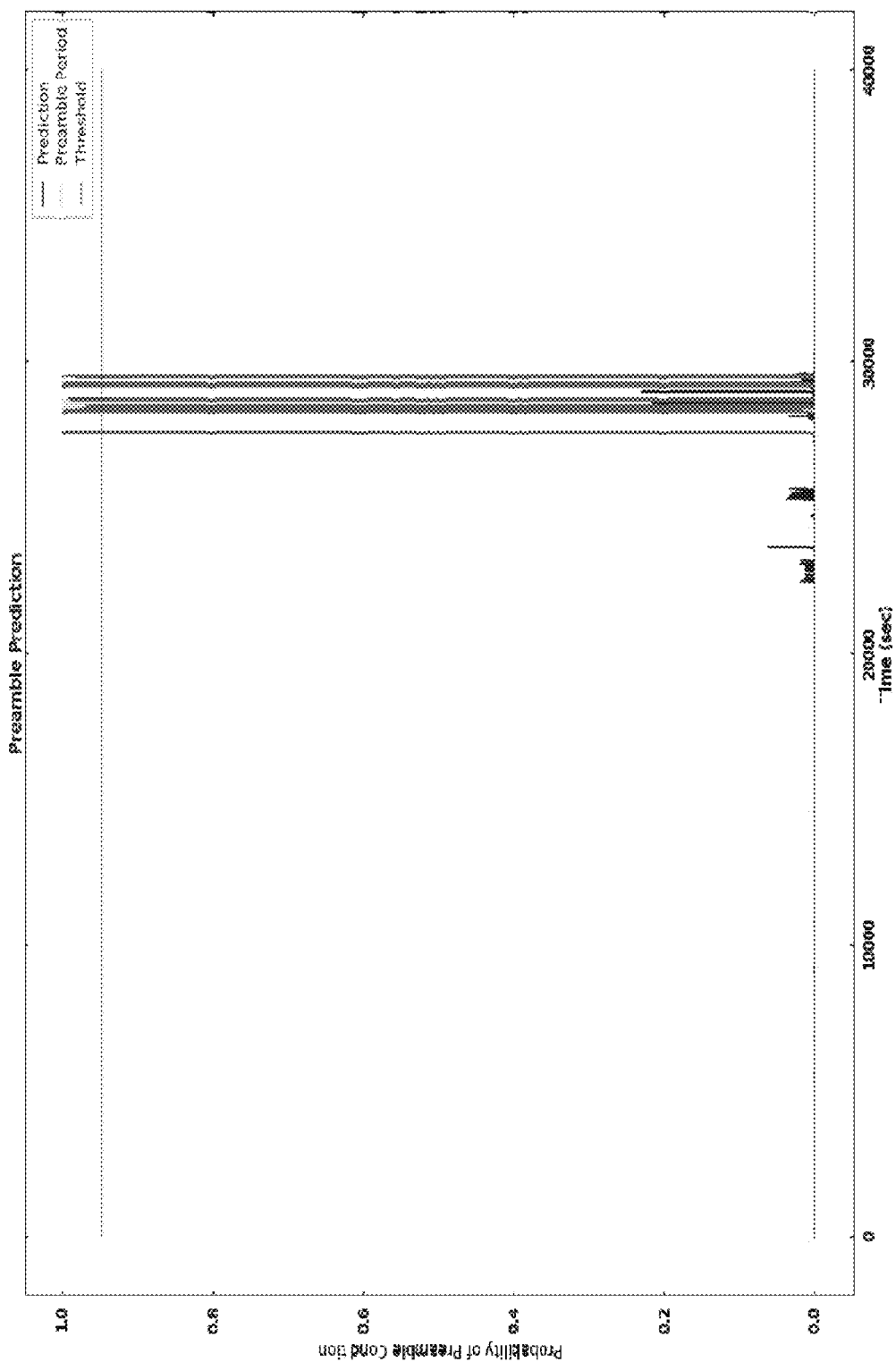
FIG. 9 is a second disruption analysis of a server.

FIGS. 8-16 show multiple disruption analysis rendered by the automated predictive systems. The orange lines in the figures represent the preamble period that precede an event. At the interval, when an event occurs, that would be a server crash in these examples. The blue lines are the predictions of a probability of a crash made by the trained automated predictive system. In FIGS. 8-16, the predictions were made without knowledge of the crash and the orange lines were later added by identifying the timing of the crashes and adding the preceding preamble periods after they occurred. The adjustable programmable red lines are part of the operating policies that are part of the potential crash profiles. They establish event thresholds when the resource allocator 404 accepts the prediction and modifies the allocation of computing resources. In FIG. 8, ten crashes are shown and each are preceded by a prediction. FIG. 9 shows three crashes each preceded by an event threshold crossing prediction. FIG. 9 also shows a number of predictions (the blue lines) that do not exceed the event threshold. As such, the controller 202 or resource allocator 404 would reject those predictions or not act upon or in response to them.

Figure 10:
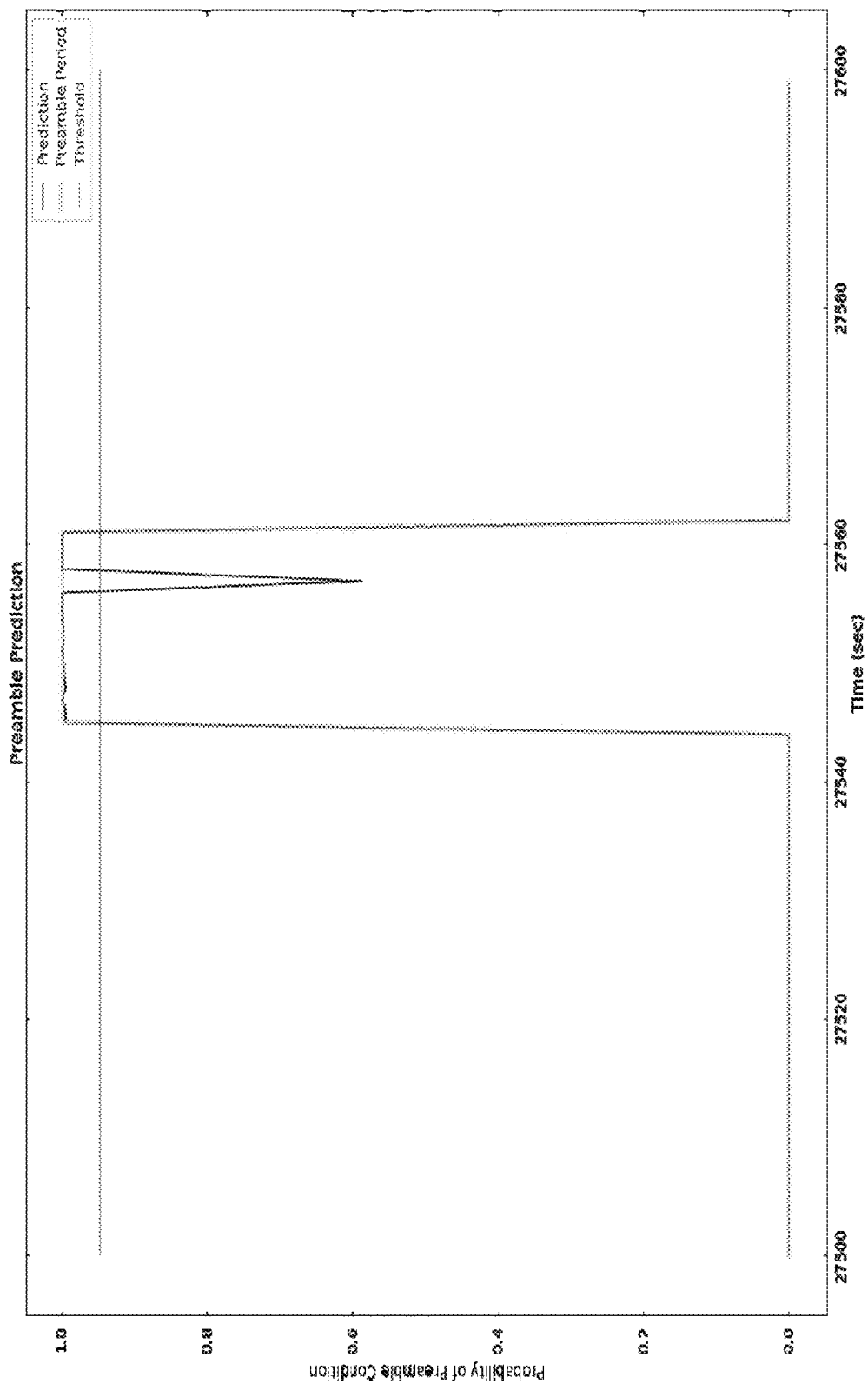
FIG. 10 is a fourth disruption analysis of a server.
Figure 11:
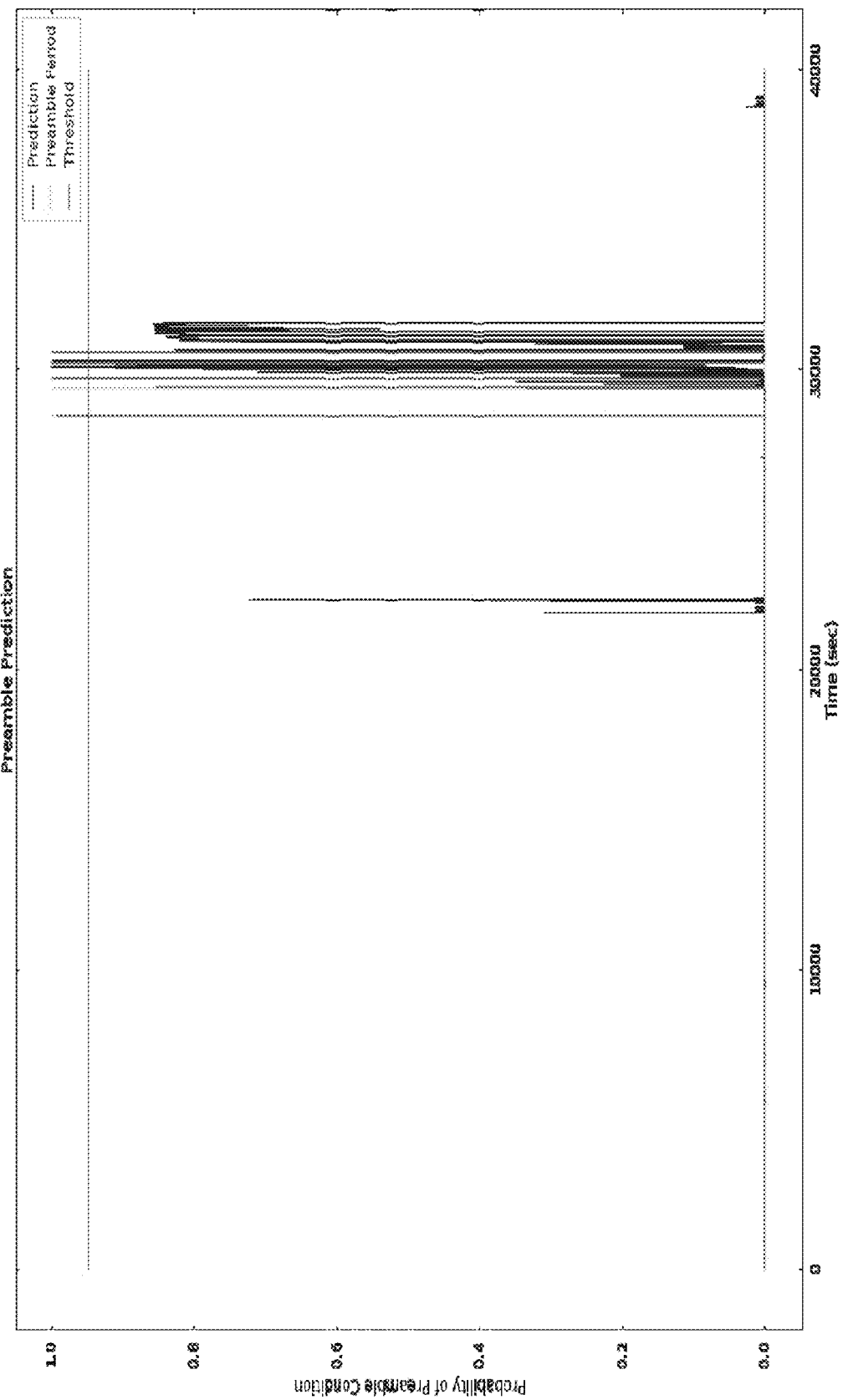
FIG. 11 is a fifth disruption analysis of a server.

In FIG. 8, the first prediction exceeding the event threshold indicate a serious event is about to occur followed by a series of blue lines bouncing above and below the event threshold. Thereafter, six crashes occur, with even more occurring above the event threshold in the preamble. The preamble period is the bounded time period preceding a failure with the latter boundary occurring nearest the failure. In FIG. 10, the solid blue line is substantially co-linear with the preamble period above the event threshold, with a triangular fall-off occurring during a short duration. FIG. 10 shows a server in running in stress-state for an extended period. If the controller 202 or resource allocator 404 were to initiate a reset, the failure would have been avoided. It is important that the resource allocator 404 initiate an organized reset if this is a cluster machine in this example. The process can drain traffic from a subset of servers, stop taking new sessions on that subset, let existing sessions expire, initiate a reset, and restart the subset. With the first subset on-line, a second, third, fourth, etc. subset can repeat the process until all the servers that comprise the cluster are reset. The process can repeat the cycle any number of times while ensuring not all of the servers are reset at once. This process can be completed without losing any sessions or losing any customers. The recovery is premised on an understanding that the failure is a software or hardware issue rather than a data issue.

Figure 12:
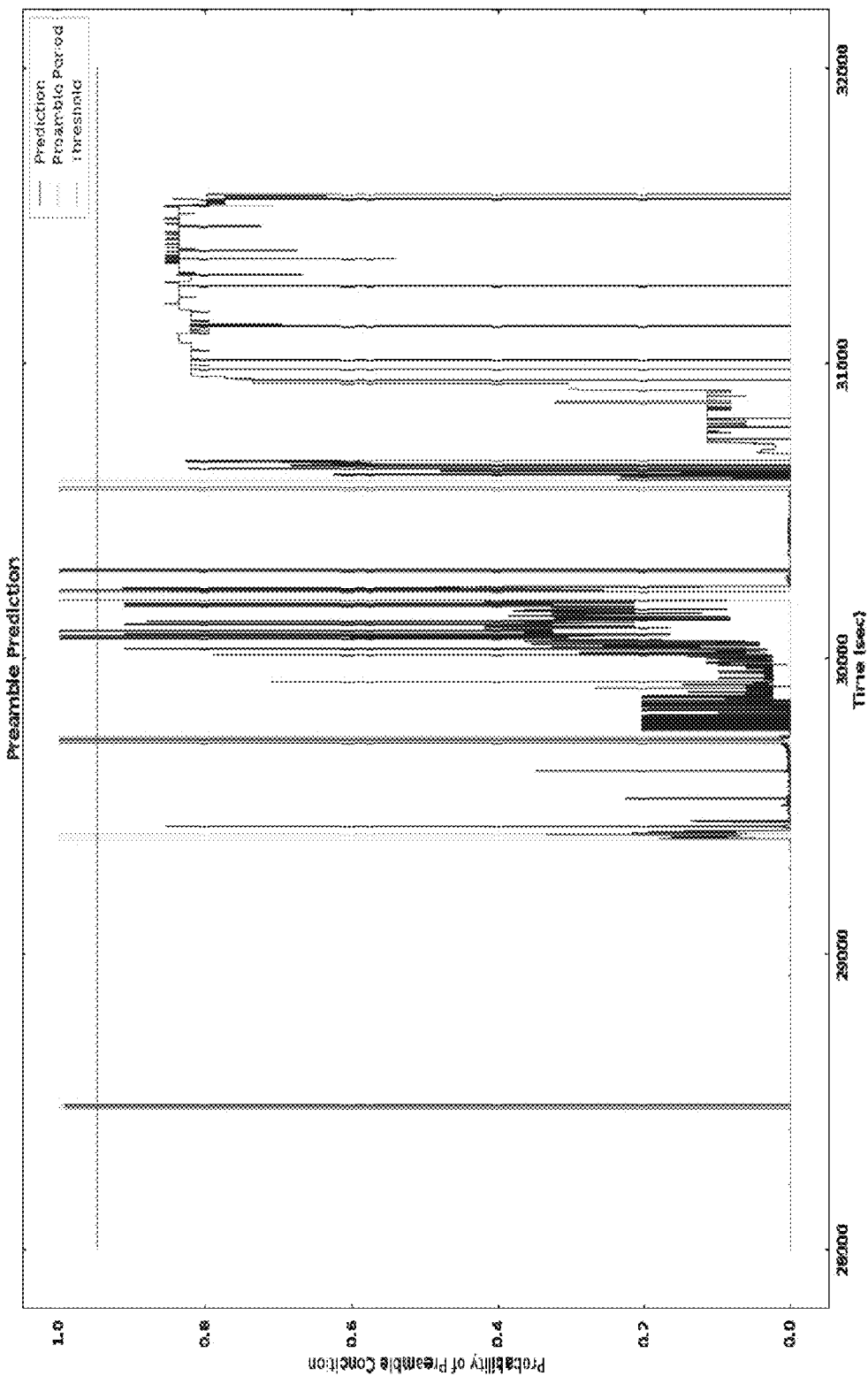
FIG. 12 is a sixth disruption analysis of a server.
Figure 13:
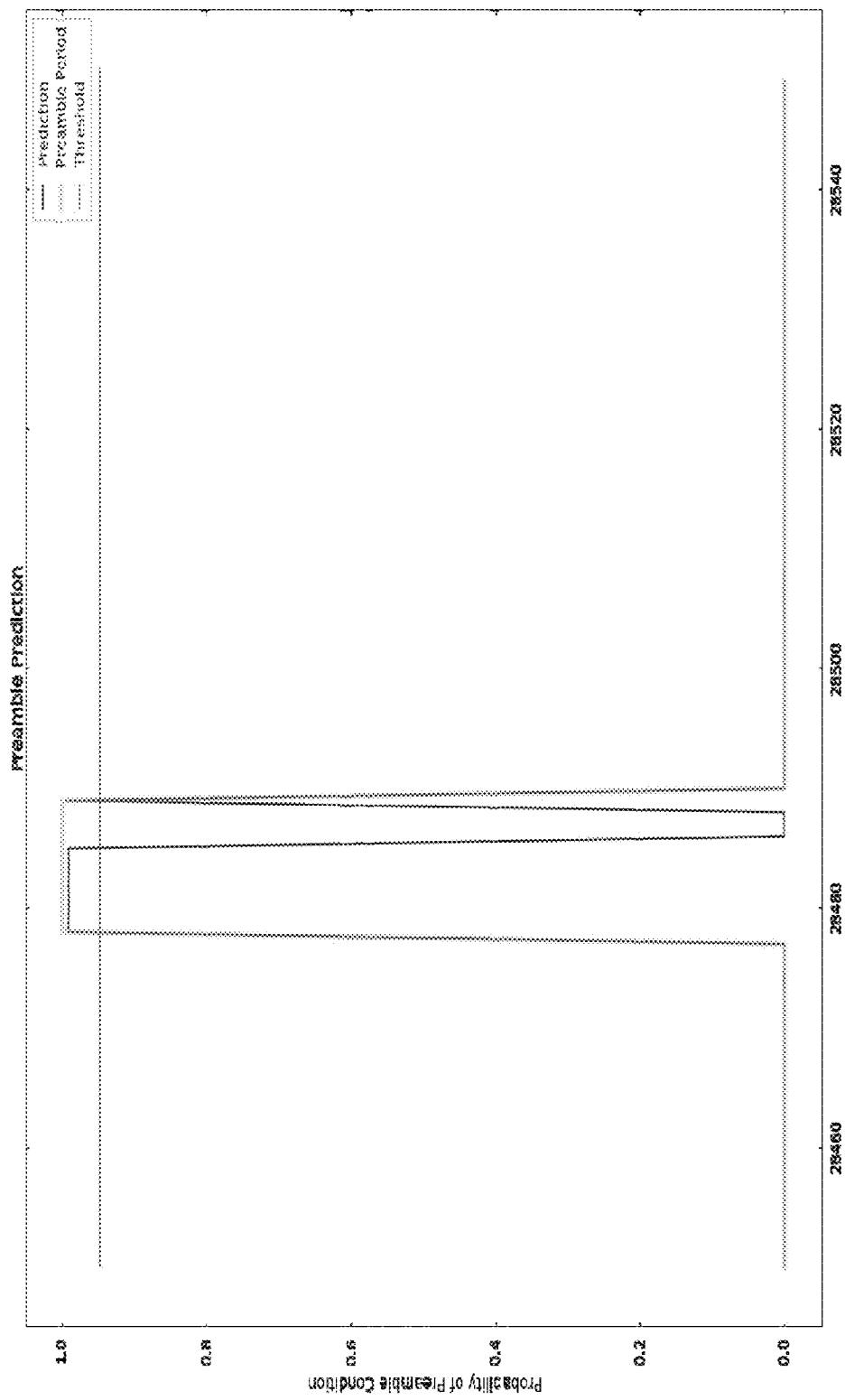
FIG. 13 is a seventh disruption analysis of a server.
Figure 14:
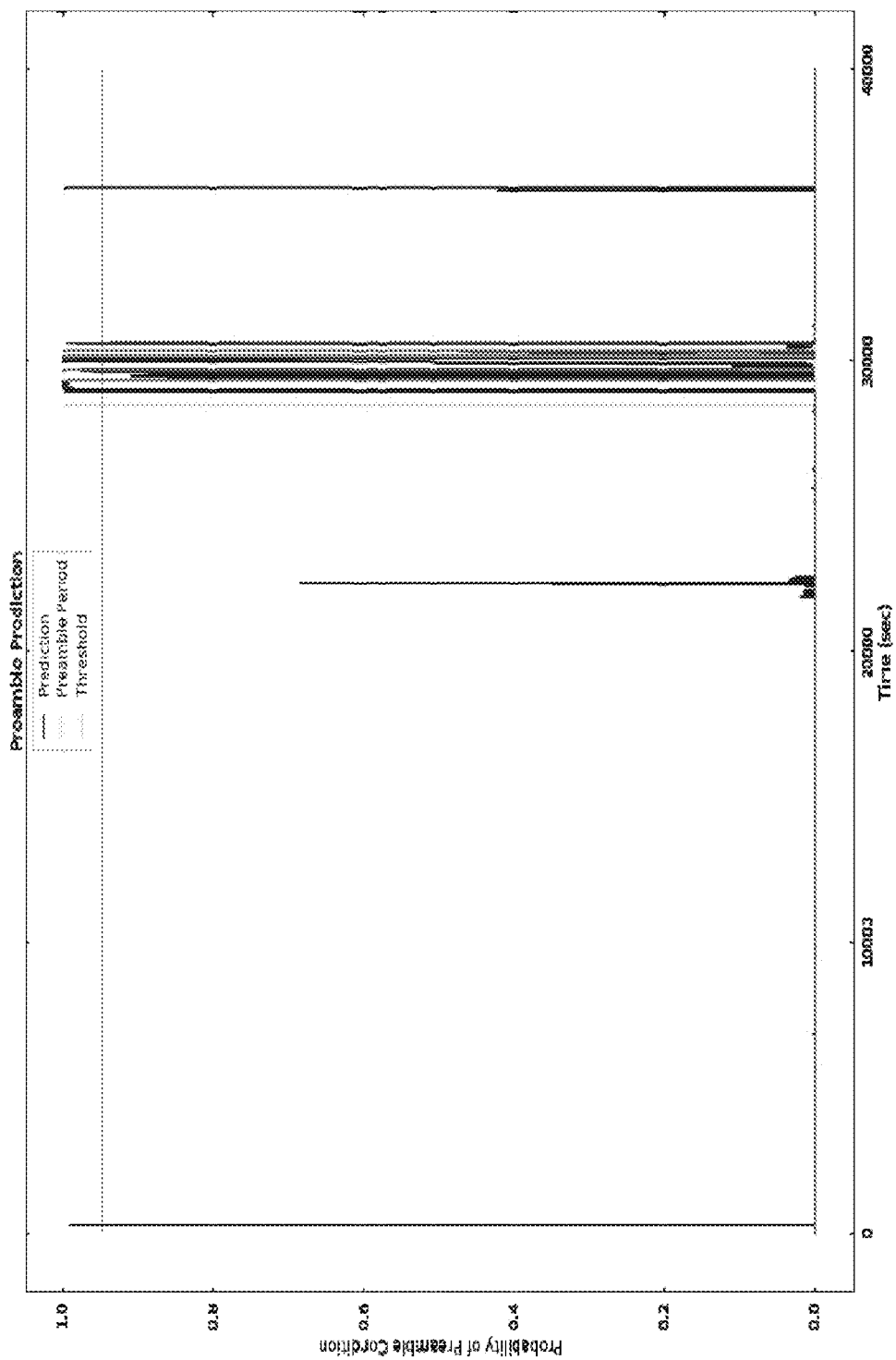
FIG. 14 is an eighth disruption analysis of a server.
Figure 15:
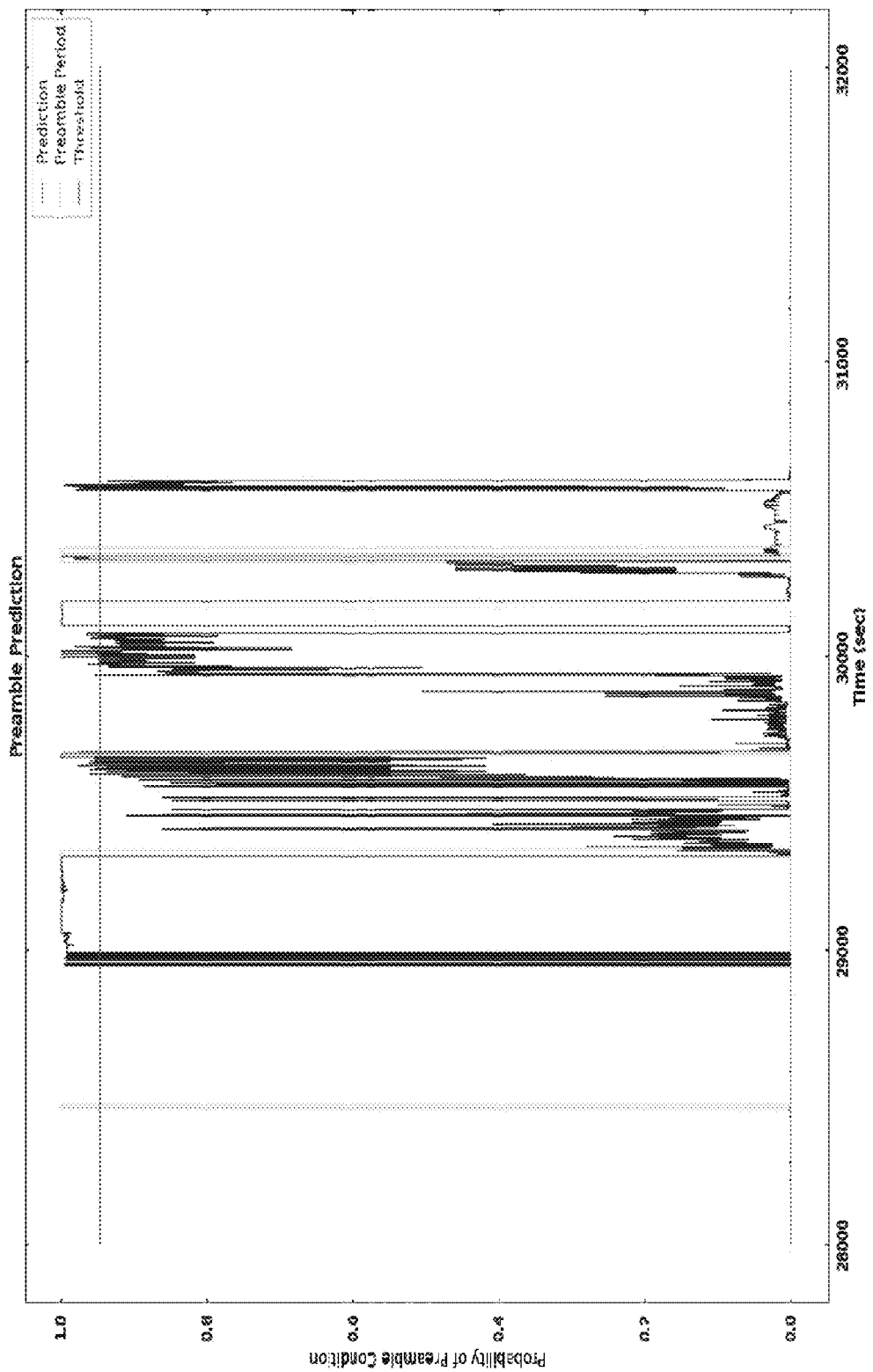
FIG. 15 a ninth disruption analysis of a server
Figure 16:
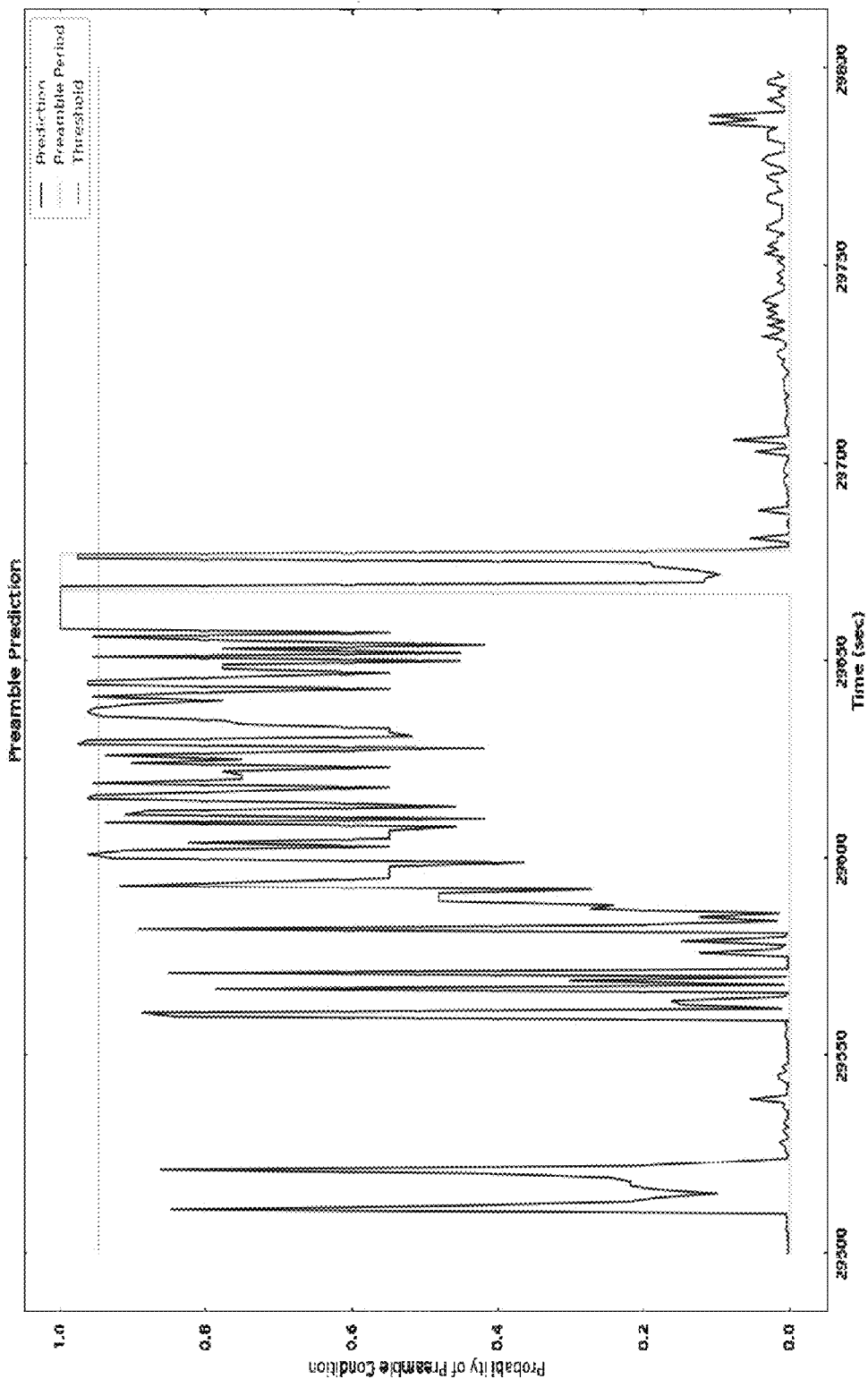
FIG. 16 is a tenth disruption analysis of a server.

When an event threshold is set to a very high level, such as about a ninety percent probability event threshold, for example, the automated predictive system is very accurate (e.g., it renders few false positive events) and is very effective. As shown, nearly all of the failures are preceded by a prediction. At an even higher event threshold level of nearly ninety-eight percent, all but one predicted crash is preceded by a failure as shown in FIG. 12. FIG. 13, like FIG. 10, shows a server in running in stress-state for an extended period. The solid blue line or prediction is substantially co-linear with the preamble period above the event threshold running at almost a ninety-eight percent probability of failure. There is a rectangular fall-off occurring during a short duration shortly before the prediction rises again above the event-threshold level and before the failure occurs. FIGS. 15 and 16 show a very high concentration of predictions that precede failures while one failure is missed in each instance. Of note, if the event threshold were lowered to about seventy-percent all the server failures shown in FIG. 15 would be predicted. FIG. 16 shows a similar condition. While the failure is predicted well before the preamble, it may be predicted even earlier when the event threshold is lowered to about eighty percent.

While each of the systems and methods shown and described herein operate automatically and operate independently, they also may be encompassed within other systems and methods including any number (N) of iterations of some or all of the process used to recognize a failure or any other type of event. Alternate automated predictive systems may include any combinations of structure and functions described or shown in one or more of the FIGS including those that predict other events beside device failures. These automated predictive systems and methods are formed from any combination of structures and functions described. The structures and functions may process additional or different input.

The functions, acts or tasks illustrated or described in the FIGS. may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination.

The automated predictive system rigorously defines the conditioned preamble period by excluding transitional periods (such as times between preamble and normal operating periods and the time between the preamble and the failure). Further, some automated predictive systems exclude actual event periods (e.g., but do not exclusively target events), and artificial events like reboots that interfere with the differentiation of preamble operating states and normal operating states. Engineered features such as those generated from rolling averages and distribution characteristics are added to raw entity data to allow recent historical conditions to influence the predictive model in some cases.

The automated predictive system improves the reliability of computers, servers and/or clusters by detecting operating conditions that precede device events, such as failures. While failures are discussed, the systems and process are also used to detect other computer events (e.g., an action or occurrence often generated by or as a result of an operating state, to which a system might respond). Unlike reactive approaches that detect failures once they occur, the automated predictive system is prognostic. It prevents data losses and performance degradation that usually occur before failures by preventing them. The systems and methods provide predictions with sufficient lead-times to mitigate failures efficiently. Some systems execute proactive functions before a failure occurs, such as modifying resource allocations in response to predictions. Identifying the likelihood of a failure of a device with sufficient lead time improves computer technology because it keeps computer services on-line, limits the unexpected time and unexpected expense incurred in a recovery, and limits costs.

Because the models generated by the automated predictive systems train on data generated during the times that occur well before a device failure (e.g., during a normal operating period) and those that precede failures (e.g., within a conditioned preamble period), the automated predictive systems protect against known and unknown causes of device failures. The systems do not need to detect or identify the originating causes of a device's failure to predict its failure and prevent it. The disclosed operating state-based approach can analyze one or more data feeds and/or data sets to determine if one or more devices will soon be in an undesired or an unstable state that precede a failure.

The subject-matter of the disclosure may also relate, among others, to the following aspects (referenced by numbers):

1. A method comprising:
    receiving, by a controller, a crash profile;

generating, by the controller, granular information that identifies data indicative of a potential server cluster failure in an enterprise system without identifying an originating cause of the potential server cluster failure or without the need to identify an originating cause of the potential server cluster failure;

adding the granular information to the crash profile;

training a model by sampling portions of the crash profile that represents a normal operating state and a conditioned preamble operating state;

providing the trained model to a prediction engine; and modifying an allocation of computing resources in response to the prediction of the potential server cluster failure by the prediction engine monitoring one or more servers of a server cluster.

2. The method of aspect 1 where the crash profile further comprises customized operating policies that tailor the trained model to different server clusters.

3. The method of any of aspects 1 to 2 where the trained model is attached to the prediction engine.

4. The method of any of aspects 1 to 3 where the model trains on labeled samples indicative of normal conditions and indicative of a conditioned preamble.

5. The method of any of aspects 1 to 4 where the crash profile comprises a plurality of crash profiles that include normal operating state information and conditioned preamble operating state information that precede a potential server cluster failure and occur around interfering events.

6. The method of any of aspects 1 to 5 where the crash profile comprise data enforcing configurable policies that are adjustable in response to an interfering computer event and a plurality of pre-failure states.

7. The method of any of aspects 1 to 6 where the conditioned preamble state is detected by processing engineered features that differentiate patterns between normalized data of normal operating states and preambles.

8. The method of aspect 7 where the preambles comprise a bounded time period immediately preceding the time one or more servers of the serve cluster fail.

9. The method of aspect 8 where, without prior knowledge of when any of the servers that of the server cluster will fail, detect the preambles.

10. The method of aspect 9 where the bounded time period comprises a range measured in minutes.

11. The method of aspect 7 where the engineered features are generated from data that is representative of the current and past operating state of the one or more servers of the server cluster.

12. The method of aspect 7 where the engineered features represent changes in availability of memory of the one or more servers of the server cluster.

13. The method of aspect 7 where the engineered features represent an amount of memory use of the one or more servers of the server cluster.

14. The method of aspect 7 further comprising removing seasonality and noise from the normalized data.

15. The method of aspect 7 further comprising applying transformation functions that generate surrogates for missing values in the normalized data.

16. The method of aspect 7 where the controller oversamples data within the preambles relative to the sampling rate the controller samples within the normal operating state.

17. The method of aspect 7 where the controller undersamples data within the normal operating states relative to the sampling rate the controller samples within the preambles.

18. A non-transitory computer-readable medium having stored thereon software instructions that, when executed by a processor, cause the processor to:

receive a crash profile;

generate granular information that identifies data indicative of a potential server cluster failure in an enterprise system without the need to identify an originating cause of the potential server cluster failure;

adding the granular information to the crash profile;

train a model by sampling portions of the crash profile that represents a normal operating state and a conditioned preamble operating state;

couple the trained model to a prediction engine; and modify an allocation of computing resources in response to the prediction of the potential server cluster failure by the prediction engine monitoring one or more servers of a server cluster.

19. The non-transitory computer-readable medium of aspect 18 where the crash profile further comprises customized operating policies that tailor the trained model to different server clusters.

20. The non-transitory computer-readable medium of any of aspects 18 to 19 where the trained model is attached to the prediction engine.

21. The non-transitory computer-readable medium of any of aspects 18 to 20 where the model trains on labeled samples indicative of normal conditions and indicative of a conditioned preamble.

22. The non-transitory computer-readable medium of any of aspects 18 to 21 where the crash profile comprises a plurality of crash profiles that include normal operating state information and conditioned preamble operating state information that precede a potential server cluster failure and occur around interfering events.

23. The non-transitory computer-readable medium of any of aspects 18 to 22 where the crash profile comprise data enforcing configurable policies that are adjustable in response to an interfering computer event and a plurality of pre-failure states.

24. The non-transitory computer-readable medium of any of aspects 18 to 23 where the conditioned preamble state is detected by processing engineered features that differentiate patterns between normalized data and preambles.

25. The non-transitory computer-readable medium of aspect 24 where the preambles comprise a bounded time period immediately preceding the time one or more servers of the serve cluster fail.

26. The non-transitory computer-readable medium of aspect 25 where, without prior knowledge of when any of the servers that of the server cluster will fail, detect the preambles.

27. The non-transitory computer-readable medium of aspect 26 where the bounded time period comprises a range measured in minutes.

28. The non-transitory computer-readable medium of any of aspects 18 to 27 where the engineered features are generated from data that is representative of the current and past operating state of the one or more servers of the server cluster.

29. The non-transitory computer-readable medium of any of aspects 18 to 28 where the engineered features represent changes in memory use of the one or more servers of the server cluster.

30. The non-transitory computer-readable medium of any of aspects 18 to 29 where the engineered features represent an amount of memory use of the one or more servers of the server cluster.

31. The non-transitory computer-readable medium of any of aspects 18 to 30 further comprising removing seasonality and noise from the normalized data.
32. The non-transitory computer-readable medium of any of aspects 18 to 31 further comprising applying transformation functions that generate surrogates for missing values in the normalized data.
33. The non-transitory computer-readable medium of any of aspects 18 to 32 where the controller oversamples data within the preambles relative to the sampling rate the controller samples within the normal operating state.
34. The non-transitory computer-readable medium of any of aspects 18 to 33 where the controller under-samples data within the normal operating states relative to the sampling rate the controller samples within the preambles.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A method comprising:
    receiving, by a controller, a crash profile;
    generating, by the controller, granular information that identifies data indicative of a potential server cluster failure in an enterprise system without identifying an originating cause of the potential server cluster failure;
    adding the granular information to the crash profile;
    training a model by sampling portions of the crash profile that represents a normal operating state of a server cluster and a conditioned preamble operating state of the server cluster;
    providing the trained model to a prediction engine; and
    modifying an allocation of computing resources in response to the prediction of the potential server cluster failure by the prediction engine monitoring one or more servers of a second server cluster.
2. The method of claim 1 where the crash profile further comprises a plurality of customized operating policies that tailor the trained model to different server clusters.
3. The method of claim 1 where the act of training the model processes labeled samples indicative of a plurality of normal operating conditions and samples indicative of a conditioned preamble.
4. The method of claim 1 where the crash profile comprises a plurality of crash profiles that include normal operating state information and conditioned preamble operating state information that precede a server cluster failure and occur around interfering computing events.
5. The method of claim 4 where the crash profile comprise data enforcing configurable policies that are adjustable in response to one interfering computer event and a plurality of pre-failure states.
6. The method of claim 1 where the conditioned preamble operating state is detected by processing engineered features that differentiate patterns between normalized data of normal operating states and preambles that precede computer failures.
7. The method of claim 6 where the preambles comprise a bounded time period immediately preceding the time at which one or more servers of the serve cluster fail.
8. The method of claim 7 where, without prior knowledge of when any of the servers of the second server cluster will fail, detecting the preambles.
9. The method of claim 8 where the bounded time period comprises a range of time measured in minutes.
10. The method of claim 6 where the engineered features are generated from data that is representative of a current and a past operating state of the one or more servers of the server cluster.
11. The method of claim 6 where the engineered features represent changes in availability of memory of the one or more servers of the server cluster.
12. The method of claim 6 where the engineered features represent an amount of memory used by the one or more servers of the server cluster.
13. The method of claim 6 further comprising removing seasonality and noise from the normalized data.
14. The method of claim 6 further comprising applying transformation functions that generate surrogate values for missing values in the normalized data.
15. The method of claim 6 where the controller over-samples data within the preambles relative to the sampling rate the controller samples within the normal operating state.
16. The method of claim 6 where the controller under-samples data within the normal operating states relative to the sampling rate the controller samples within the preambles.
17. A non-transitory computer-readable medium having stored thereon software instructions that, when executed by a processor, cause the processor to:
    receive a crash profile;
    generate granular information that identifies data indicative of a potential server cluster failure in an enterprise system without identifying an originating cause of the potential server cluster failure;
    add the granular information to the crash profile;
    train a model by sampling portions of the crash profile that represents a normal operating state of a server cluster and a conditioned preamble operating state of the serve cluster;
    couple the trained model to a prediction engine; and
    modify an allocation of computing resources in response to the prediction of the potential server cluster failure by the prediction engine monitoring one or more servers of a second server cluster.
18. The non-transitory computer-readable medium of claim 17 where the crash profile further comprises customized operating policies that tailor the trained model to a plurality of server clusters.
19. The non-transitory computer-readable medium of claim 17 where the crash profile comprises a plurality of crash profiles that include normal operating state information and conditioned preamble operating state information that precede a server cluster failure and occur around an interfering computer events.
20. The non-transitory computer-readable medium of claim 19 where the crash profile comprise data enforcing configurable operating policies that are adjustable in response to one interfering computer event and a plurality of pre-failure states.
21. The non-transitory computer-readable medium of claim 17 where the conditioned preamble state is detected by processing engineered features that differentiate patterns between normalized data and preambles.
22. The non-transitory computer-readable medium of claim 21 where the preambles comprise a bounded time period immediately preceding the time at which one or more servers of the serve cluster fail.

23. The non-transitory computer-readable medium of claim 22 where, without prior knowledge of when any of the servers of the second server cluster will fail, detecting the preambles.

24. The non-transitory computer-readable medium of claim 17 where the engineered features are generated from data that is representative of a current and a past operating state of the one or more servers of the server cluster.

25. The non-transitory computer-readable medium of claim 17 where the engineered features represent changes in memory use of the one or more servers of the server cluster.

26. The non-transitory computer-readable medium of claim 17 where the engineered features represent an amount of memory used by the one or more servers of the server cluster.

27. The non-transitory computer-readable medium of claim 17 further comprising removing seasonality and noise from the normalized data.

28. The non-transitory computer-readable medium of claim 17 further comprising applying transformation functions that generate surrogate values for missing values in the normalized data.

29. The non-transitory computer-readable medium of claim 17 where the controller oversamples data within the preambles relative to the sampling rate the controller samples within the normal operating state.

30. The non-transitory computer-readable medium of claim 17 where the controller under-samples data within the normal operating states relative to the sampling rate the controller samples within the preambles.

* * * * *